US012600411B2

(12) United States Patent
Arita

(10) Patent No.: US 12,600,411 B2
(45) Date of Patent: Apr. 14, 2026

(54) VEHICLE FRONT PART STRUCTURE

(71) Applicant: TOYOTA JIDOSHA KABUSHIKI KAISHA, Toyota (JP)

(72) Inventor: Kosuke Arita, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 349 days.

(21) Appl. No.: 18/525,877

(22) Filed: Dec. 1, 2023

(65) Prior Publication Data

US 2024/0253704 A1     Aug. 1, 2024

(30) Foreign Application Priority Data

Jan. 27, 2023     (JP) .................................. 2023-011222

(51) Int. Cl.
B62D 21/15          (2006.01)
(52) U.S. Cl.
CPC .................................. B62D 21/152 (2013.01)
(58) Field of Classification Search
CPC ....... B62D 21/152; B62D 21/155; B60K 5/12
See application file for complete search history.

(56) References Cited

U.S. PATENT DOCUMENTS

| | | | | |
|---|---|---|---|---|
| 6,655,728 B2 * | 12/2003 | Sano | ...................... | B62D 21/15 |
| | | | | 296/203.02 |
| 8,708,401 B2 * | 4/2014 | Lee | ...................... | B62D 21/152 |
| | | | | 280/124.109 |

| | | | | |
|---|---|---|---|---|
| 10,807,548 B2 * | 10/2020 | Wada | ...................... | B62D 25/08 |
| 2014/0008924 A1 * | 1/2014 | Han | ........................... | F16F 7/12 |
| | | | | 293/133 |
| 2014/0062106 A1 * | 3/2014 | Han | ........................... | F16F 7/12 |
| | | | | 293/133 |
| 2014/0361561 A1 * | 12/2014 | Kuriyama | ............... | B60R 19/34 |
| | | | | 293/133 |
| 2015/0314742 A1 * | 11/2015 | Kato | ...................... | B60R 19/34 |
| | | | | 293/155 |
| 2016/0167712 A1 * | 6/2016 | Ogawa | ................... | B62D 25/08 |
| | | | | 296/187.1 |
| 2017/0106823 A1 * | 4/2017 | Lieven | .................... | B60R 19/34 |
| 2019/0161037 A1 * | 5/2019 | Yoshida | ............... | B62D 21/152 |
| 2019/0315410 A1 * | 10/2019 | Shinya | ................. | B62D 25/082 |
| 2024/0262426 A1 * | 8/2024 | Murata | ................. | B62D 21/152 |
| 2025/0178673 A1 * | 6/2025 | Sekiguchi | ............ | B62D 29/008 |

FOREIGN PATENT DOCUMENTS

WO          2022/031991 A1     2/2022

* cited by examiner

*Primary Examiner* — Faye M Fleming
(74) *Attorney, Agent, or Firm* — SOLARIS Intellectual Property Group, PLLC

(57)          ABSTRACT

A vehicle front part structure includes a pair of left and right suspension towers, and a pair of left and right front side members disposed at vehicle lower sides of the suspension towers and extending in a vehicle front-rear direction, and is integrally molded by die casting. The front side member has plural compartments arranged internally in the vehicle front-rear direction, and has plural convex parts, protruding outward on progression toward the vehicle rear, at an inner side surface in a vehicle width direction. The plural convex parts provided in the plural compartments are continuously formed in the vehicle front-rear direction so as to discharge fragments from fractures caused by deformation at a time of a collision outward from a cross section.

9 Claims, 8 Drawing Sheets

VEHICLE FRONT PART STRUCTURE

CROSS-REFERENCE TO RELATED APPLICATION

This application is based on and claims priority under 35 USC 119 from Japanese Patent Application No. 2023-011222, filed on Jan. 27, 2023, the disclosure of which is incorporated by reference herein.

BACKGROUND

Technical Field

The present disclosure relates to a vehicle front part structure.

Related Art

For example, International Publication (WO) No. 2022/0319191 discloses a structure that absorbs energy by fracturing of a side member formed by casting or the like during a collision. The energy absorbing structure of WO No. 2022/0319191 is configured including plural ribs arrayed at the front and rear of a vehicle, and corrugations provided between the ribs.

However, after breakage due to fracturing of the side member during a collision, if debris is jammed inside the side member, there may be cases in which vehicle deformation (stroke) during a collision is not sufficiently obtained, and the desired amount of energy absorption is not realized, and there is room for improvement in the structure of the side members.

SUMMARY

The present disclosure obtains a vehicle front part structure that can inhibit fragments from a fracture caused by a load applied to a front side member during a collision from accumulating inside the front side member, and moreover, that can easily realize the intended amount of energy absorption.

A vehicle front part structure of a first aspect includes: a left and right pair of suspension towers respectively disposed at left and right sides of a vehicle front part; and a left and right pair of front side members disposed at vehicle lower sides of the suspension towers, extending in a vehicle front-rear direction, having plural compartments arranged internally in the vehicle front-rear direction, and having, at an inner side surface in a vehicle width direction, plural convex parts that protrude outward on progression toward a vehicle rear, the plural convex parts being provided at the plural compartments and being formed continuously in the vehicle front-rear direction so as to discharge fragments from fractures caused by deformation at a time of a collision outward from a cross section, the vehicle front part structure being integrally molded by die casting.

According to the vehicle front part structure of the first aspect, the front side member has plural compartments arranged internally in the vehicle front-rear direction, and has plural convex parts protruding outward, on progression toward the vehicle rear, at an inner side surface in the vehicle width direction. Moreover, the plural convex parts provided at the plural compartments are continuously formed in the vehicle front-rear direction so as to discharge fragments from fractures caused by deformation at a time of a collision outward from a cross section.

Accordingly, during a collision, the front side member is induced to deform so as to move toward the vehicle inner side—namely, outward from the cross section of the front side member—along the outer surface of the convex part, enabling fragments from fractures caused by a collision load applied to the front side member to be inhibited from accumulating inside the front side member. As a result, the vehicle front part structure of the first aspect can facilitate the realization of an intended amount of energy absorption, since a situation in which the front side member does not deform as intended, owing to debris accumulating inside the front side member at the time of a collision, is inhibited.

A vehicle front part structure of a second aspect is the first aspect, in which a vertex of each of the convex parts is positioned further toward a rear side than a center of one of the compartments in the vehicle front-rear direction.

According to the vehicle front part structure of the second aspect, the vertex of the convex part is located rearward of the center of the compartment in the vehicle front-rear direction. As a result, since the range of the outer surface of the convex part that projects outward on progression toward the rear of the vehicle can be made wider than the range of an outer surface that projects outward on progression toward the front of the vehicle, the front side member can be more easily induced to move toward an inner side of the vehicle in a collision; namely, outward from the cross section of the front side member.

A vehicle front part structure of a third aspect is the first aspect or the second aspect, in which a start point of each of the convex parts is disposed at a position corresponding to a front face of one of the compartments in the vehicle front-rear direction.

According to the vehicle front part structure of the third aspect, since the start point of the convex part is disposed at a position corresponding to the front face of the compartment in the vehicle front-rear direction, the convex part can be positioned within a range including a position corresponding to the compartment at the inner side surface of the front side member in the vehicle width direction. As a result, since the convex part can be formed within a range not including a wall configuring the compartment in the front-rear direction of the vehicle—namely, within a range including the inner side surface that is easily deformable—deformation during a collision can be more easily induced.

A vehicle front part structure of a fourth aspect is any one of the first aspect to the third aspect, in which an end point of each of the convex parts is disposed at a position corresponding to a rear face of one of the compartments in the vehicle front-rear direction.

According to the vehicle front part structure of the fourth aspect, since the end point of the convex part is disposed at a position corresponding to the rear surface of the compartment in the vehicle front-rear direction, the convex part can be positioned within a range including a position corresponding to the compartment at the inner side surface of the front side member in the vehicle width direction. As a result, since the convex part can be formed within a range not including a wall configuring the compartment in the front-rear direction of the vehicle—namely, within a range including the inner side surface that is easily deformable—deformation during a collision can be more easily induced.

A vehicle front part structure of a fifth aspect is any one of the first aspect to the fourth aspect, in which, in the front side member, among the plural compartments, each of the convex parts is provided at each of plural compartments positioned at a vehicle forward side.

According to the vehicle front part structure of the fifth aspect, since the front side member is provided with the convex part at each of the plural compartments situated at the front side of the vehicle, further deformation of a location at which a collision load is applied at the time of a front collision can be induced.

As described above, the vehicle front part structure according to the present disclosure has an excellent advantageous effect of inhibiting fragments from fractures caused by a load applied to the front side member during a collision from accumulating inside the front side member, and also of enabling the intended amount of energy absorption to be easily realized.

BRIEF DESCRIPTION OF THE DRAWINGS

Exemplary embodiments of the present invention will be described in detail based on the following figures, wherein.

DETAILED DESCRIPTION

Exemplary Embodiment 1

Figure 1:
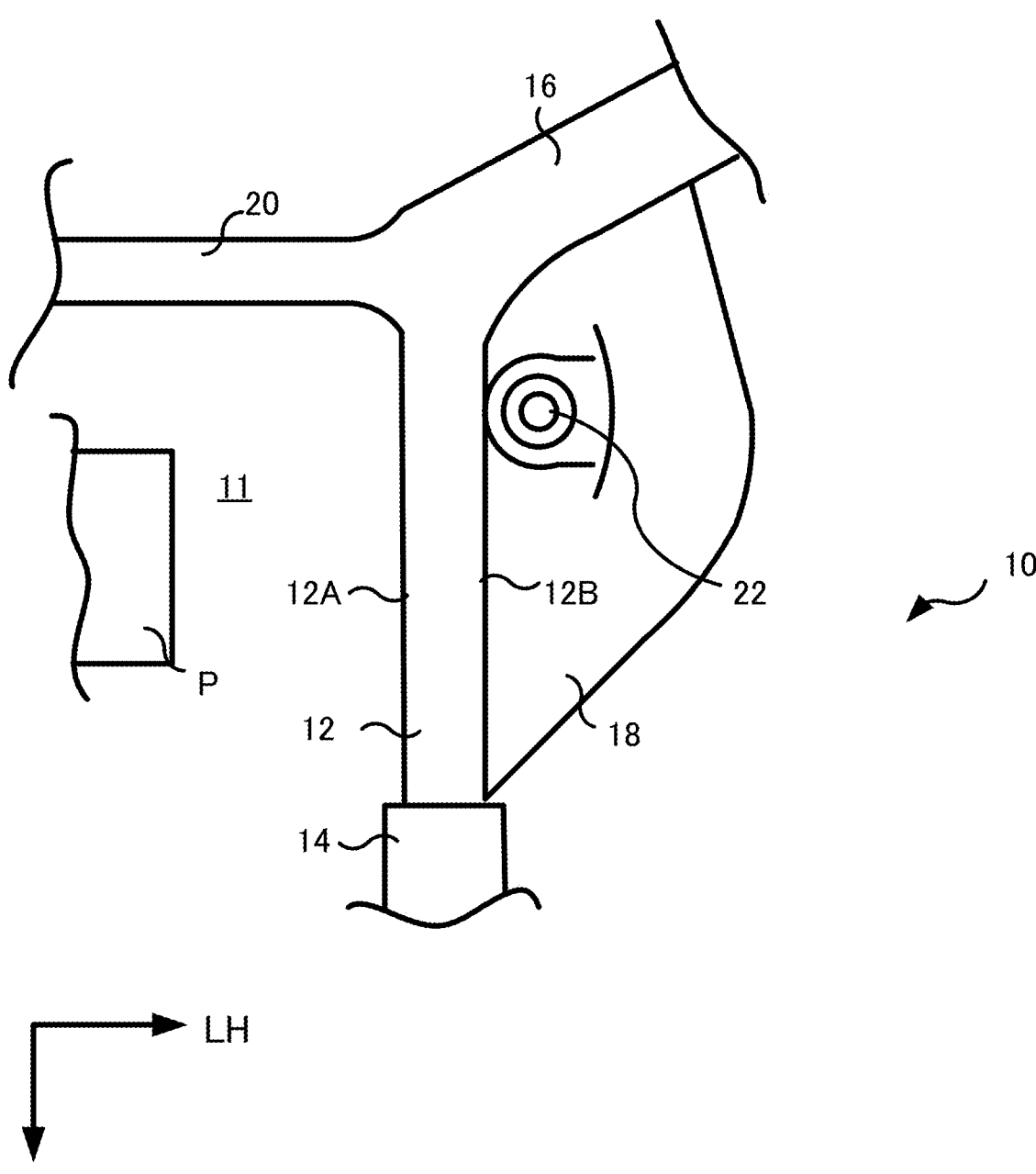
FIG. 1 is a plan view schematically illustrating an example of a main part of a vehicle front part including a vehicle front part structure according to a first exemplary embodiment of the present disclosure.

Explanation follows regarding a vehicle front part structure according to a first exemplary embodiment of the present disclosure, with reference to the drawings. Note that since the vehicle front part structure is a structure having left/right symmetry, only the left side part is illustrated in the drawings, and description of the right side part is omitted. The arrow FR illustrated in the drawings indicates a front side in a front-rear direction of the vehicle, and the arrow UP indicates an upper side in a vertical direction of the vehicle. The arrow LH indicates the left side in the vehicle width direction, and in the present exemplary embodiment indicates the outer side in the vehicle width direction. Note that in the present exemplary embodiment, for simplicity, explanation follows assuming that the left side of the vehicle is the outer side in the vehicle width direction, and the right side of the vehicle is the inner side in the vehicle width direction (the central side in the vehicle width direction). In the following explanation, when reference is simply made to a forward/rearward, upward/downward, or left/right direction, these refer to forward/rearward in a front-rear direction of the vehicle, upward/downward in a vertical direction of the vehicle, and left/right in a left/right direction of the vehicle (vehicle width direction), unless otherwise specified. Moreover, for example, since a configuration having left/right symmetry is applied to the configuration of the present exemplary embodiment, the present disclosure can be applied even in a configuration in which the right side of the vehicle is the outer side in the vehicle width direction, and the left side of the vehicle is the inner side in the vehicle width direction (the central side in the vehicle width direction).

(Configuration of Vehicle Front Part Structure)

First, explanation follows regarding a configuration of the vehicle front part structure 10 according to the first exemplary embodiment. FIG. 1 is a plan view schematically illustrating an example of a main part of a vehicle front part including the vehicle front part structure 10. As illustrated in FIG. 1, in the present exemplary embodiment, the vehicle front part structure 10 is incorporated in an electric vehicle (EV); for example, an electric vehicle such as an electric battery vehicle (BEV) or a fuel cell electric vehicle (FCEV) that runs with power generated by a power unit P. A power unit chamber 11 in which the power unit P is installed is provided at a front part of the vehicle.

The vehicle front part structure 10 is a side skeleton member of a vehicle, and includes a pair of left and right front side members 12 situated on respective sides of a vehicle front part in a vehicle width direction. The front side member 12 extends in a vehicle front-rear direction, and an end part of the front side member 12 rearward of the vehicle is connected to a cross member (not illustrated). Moreover, a vehicle front end part of the front side member 12 is connected to a front bumper reinforcement (not illustrated; hereafter referred to as a "bumper RF") disposed along the vehicle width direction. In the present exemplary embodiment, as an example, a crash box 14 serving as an energy absorbing member is interposed between the front side member 12 and the bumper RF.

The crash box 14 is configured so as to deform before the front side member 12 deforms and absorb a portion of the energy of the collision when the vehicle is involved in a frontal impact collision. When an impact load is transmitted from the bumper RF to the crash box 14, the crash box 14 is compressed in a forward-rearward direction.

A pair of left and right apron upper members 16 extending in a vehicle vertical direction are disposed at an outer side in the vehicle width direction of the vehicle rearward side of the front side member 12. A pair of left and right fender aprons 18 are disposed at an outer side of the front side member 12 in the vehicle width direction and at a vehicle forward side of the apron upper member 16. The front side member 12 and the apron upper member 16 have a substantially rectangular cross-sectional shape that is opened to the outer side in the vehicle width direction.

A dash panel 20 is disposed at a vehicle rearward side of the front side member 12 and between the pair of right and left apron upper members 16. The dash panel 20 is a member that separates the power unit chamber 11 from a vehicle cabin (not illustrated), and that extends in a vehicle width direction and a vehicle vertical direction with a plate thickness direction being the vehicle front-rear direction. An end part of the dash panel 20 in the vehicle width direction is connected to the fender apron 18.

A suspension tower 22 is provided towards the top of the vehicle at an outer side in the vehicle width direction at a vehicle rearward side of the front side member 12. The vehicle lower sides of the suspension tower 22 are connected to the fender apron 18, the fender apron 18 is formed so as to bulge inward in the vehicle width direction, and a wheel house is also formed in which a non-illustrated front wheel is housed so as to be steerable.

The suspension tower 22 is provided so as to project substantially in a cylindrical shape toward a vehicle upward side from a wheel house—namely a bulging part—of the fender apron 18. Inside the suspension tower 22, a shock absorber and a spring configuring a non-illustrated suspension that supports a front wheel housed in a wheel house of the fender apron 18 are housed.

The vehicle front part structure 10, including a pair of left and right front side members 12 and a pair of left and right suspension towers 22, is integrally molded by die casting. Note that in the present exemplary embodiment, the pair of left and right front side members 12, the pair of left and right suspension towers 22, and peripheral components of the pair of left and right suspension towers 22—namely the apron upper member 16, the fender apron 18, and the dash panel 20—are integrally molded by die casting.

Figure 2:
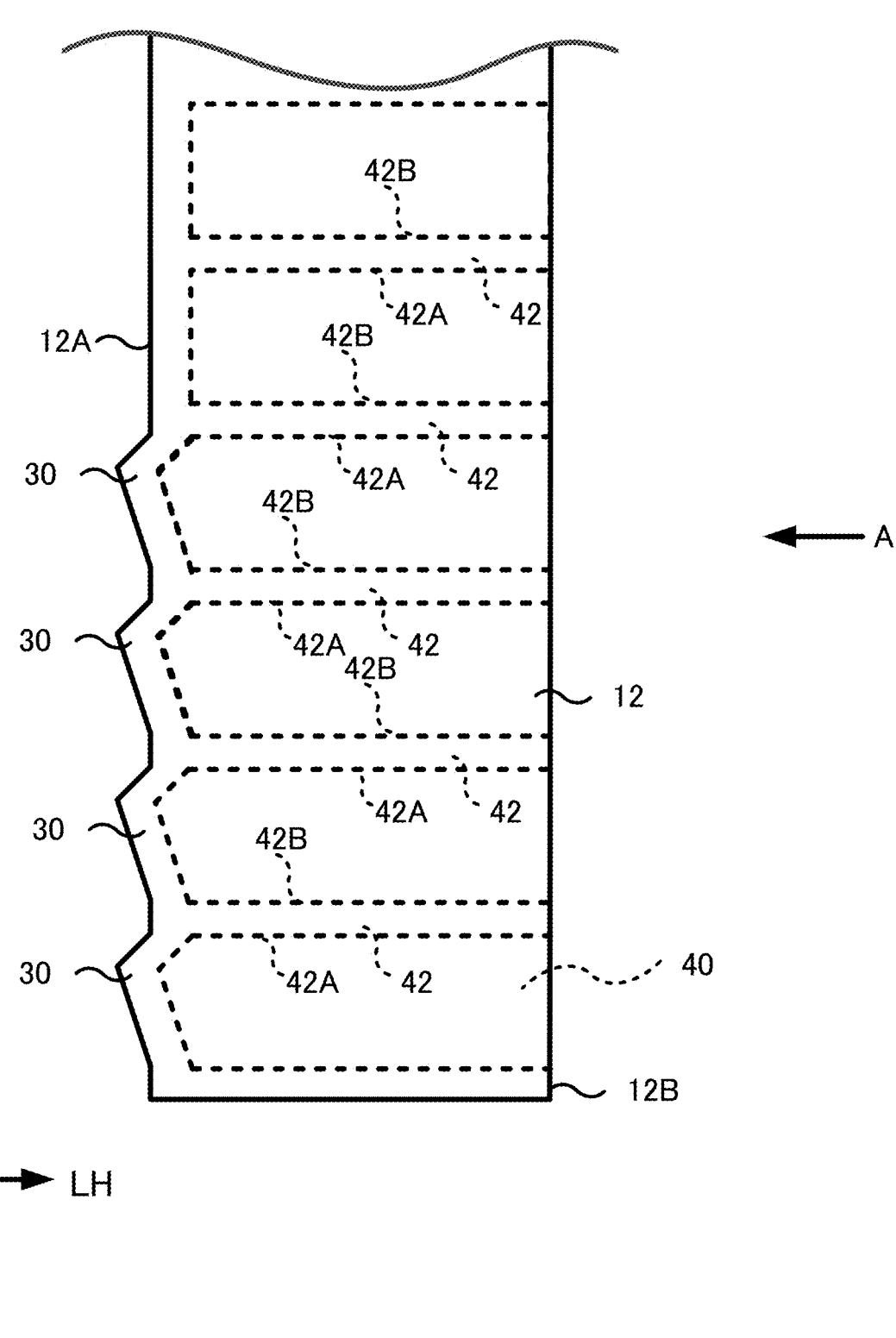
FIG. 2 is a plan view illustrating a schematic configuration of a front end part of a front side member.

Next, explanation follows regarding the structure of the front side member 12. Note that in the present exemplary embodiment, as illustrated in FIG. 1, explanation follows with the vehicle right side surface of the front side member 12 as the inner side surface 12A, and the vehicle left side surface as the outer side surface 12B. FIG. 2 is a plan view illustrating a schematic configuration of a front end part of the front side member 12, and FIG. 3 is a side view of a front end part of a front side member viewed from a direction indicated by an arrow A in FIG. 2, and is a schematic view illustrating a shape of an inner side surface of the front side member illustrated corresponding to this side view.

As illustrated in FIG. 2, the front side member 12 is open at the outer side of the vehicle, and includes plural compartments 40 arranged inside in a front-rear direction of the vehicle, for example. As illustrated in FIG. 3, each compartment 40 includes a rectangular opening 41 having long sides in a vertical direction of the vehicle on the outer side surface 12B. In the present exemplary embodiment, the compartment 40 is formed by disposing a partition wall 42 extending in the vehicle vertical direction inside the front side member 12. Note that in the present exemplary embodiment, the front surface 42A is a surface forming the compartment 40 that is located at the vehicle forward side, and the rear surface 42B is a surface located at the vehicle rearward side.

Figure 3:
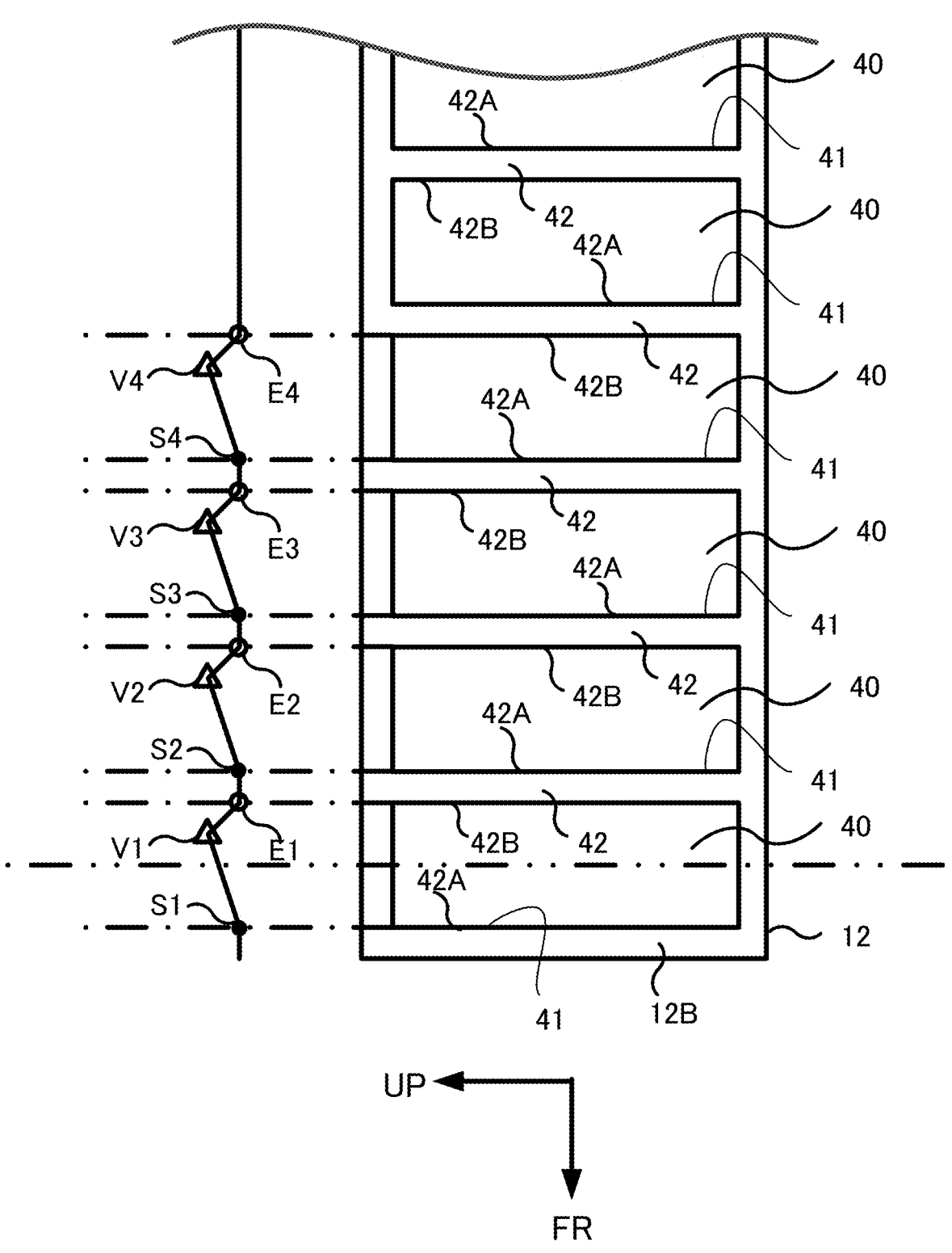
FIG. 3 is a side view of a front end part of a front side member viewed from a direction indicated by an arrow A in FIG. 2, and is a schematic view illustrating a shape of an inner side surface of the front side member illustrated corresponding to this side view.

As illustrated in FIG. 2 and FIG. 3, the inner side surface 12A of the front side member 12 is provided with plural convex parts 30 formed continuously in the front-rear direction of the vehicle, and a convex part 30 is provided for each of the compartments 40. The plural convex parts 30 are configured so as to discharge fragments of fractures, resulting from deformation during a vehicle collision, outward from the cross section. More specifically, the convex part 30 is formed so as to project outward—namely, inward in the vehicle width direction—on progression towards the rear of the vehicle.

As illustrated in FIG. 3, as an example, in the present exemplary embodiment, convex parts 30 are provided at the four compartments 40 situated at the front side of the vehicle, and each convex part 30 has a start point S, a vertex V, and an end point E from the front of the vehicle toward the rear of the vehicle. In the present exemplary embodiment, the four convex parts 30 from the convex part 30 situated at the furthermost forward side of the vehicle to the convex part 30 situated at the rearward side are formed in this order from the vehicle forward side by joining the first start point A1, the first vertex V1, the first end point E1, the second start point A2, the second vertex V2, the second end point E2, the third start point A3, the third vertex V3, the third end point E3, the fourth start point A4, the fourth vertex V4, and the fourth end point E.

Figure 4:
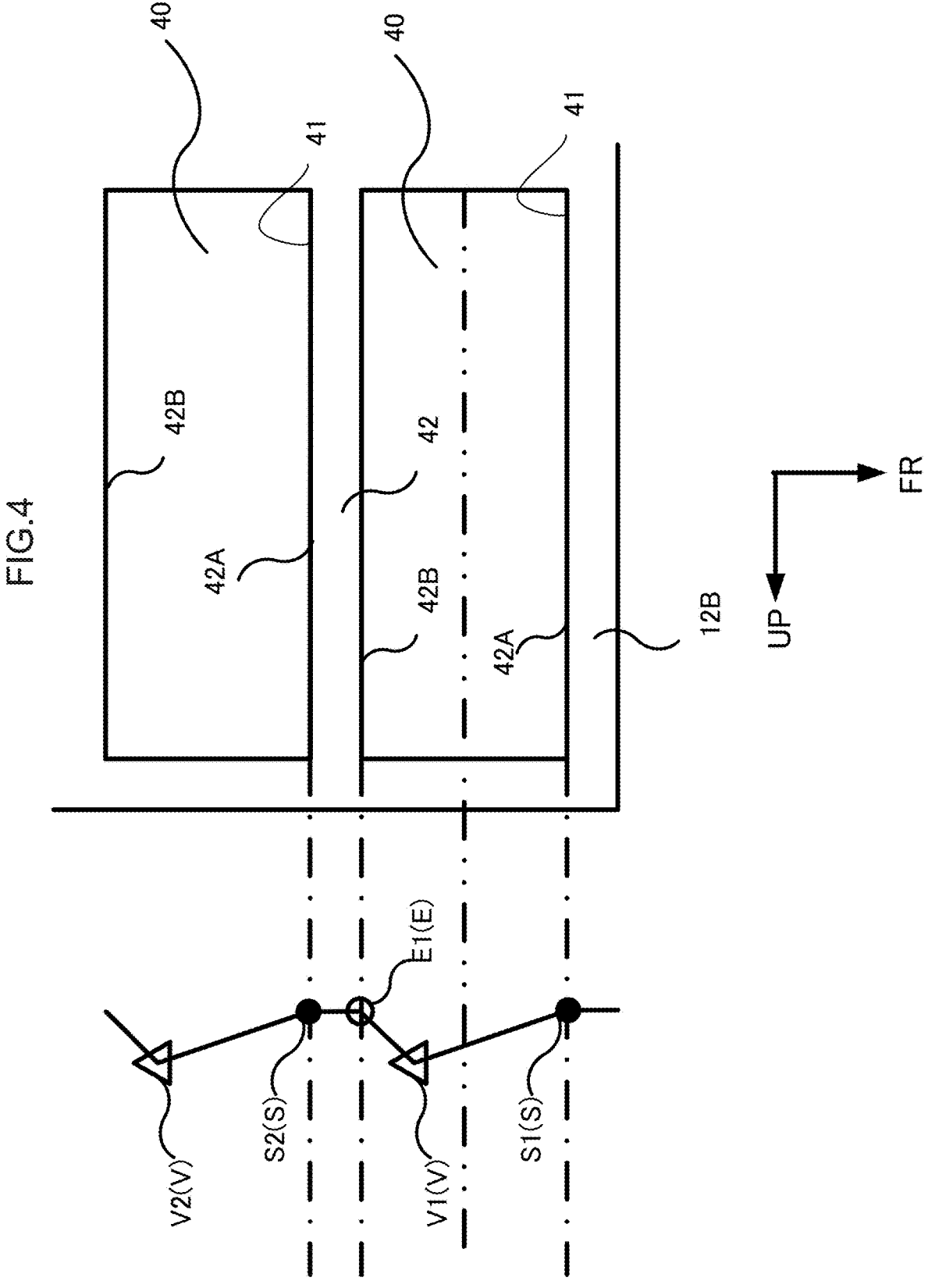
FIG. 4 is an enlarged view of a part of FIG. 3.

Since the shapes of the respective convex parts 30 are similar to each other, explanation follows regarding the shape of the convex part 30 taking as an example the convex part 30 situated at the furthermost forward side of the vehicle. FIG. 4 is an enlarged view illustrating a portion of FIG. 3 in an enlarged manner. As illustrated in FIG. 4, the vertex V1 of the convex part 30 is situated rearward of the center of the compartment 40 in the vehicle front-rear direction (illustrated by the two-dot chain line in FIG. 4). In the present exemplary embodiment, as an example, the vertex V1 is positioned rearward of the center of the compartment 40 in the vehicle front-rear direction, and further, is positioned in a central vicinity, in the vehicle front-rear direction, of this rearward side.

Further, the start point S1 of the convex part 30 is disposed at a position corresponding to the front surface 42A of the compartment 40. Note that the "position corresponding to the front surface 42A" is intended to be on the same plane as the front surface 42A or near the same plane as the front surface 42A.

The end point E1 of the convex part 30 is disposed at a position corresponding to the rear surface 42B of the compartment 40. Note that the "position corresponding to the rear surface 42B" is intended to be on the same plane as the rear surface 42B or near the same plane as the rear surface 42B.

An end point E1 of the convex part 30 situated farthest toward the vehicle front side is linked to the start point S1 of the next convex part 30 that is adjacent at the vehicle rear side, on the inner side surface 12A of the front side member 12. The convex part 30 of the present exemplary embodiment is formed as described above, and the other convex parts 30 are formed similarly to the convex part 30 situated farthest toward the vehicle front side.

Operation and Effect of the First Exemplary Embodiment

Next, explanation follows regarding the operation and advantageous effects of the first exemplary embodiment.

In the vehicle front part structure 10 according to the first exemplary embodiment, the front side member 12 includes plural compartments 40 aligned in a front-rear direction of the vehicle, each of the compartments 40 having a convex part 30, that projects outward on progression toward the rear of the vehicle, at the inner side surface 12A in the vehicle width direction. Moreover, the plural convex parts 30 provided in the plural compartment chambers 40 are continuously formed in the front-rear direction of the vehicle so as to discharge fragments from fractures caused by deformation during a collision outward from the cross section.

Note that in the present exemplary embodiment, as an example, a front collision is envisioned as a collision. A front collision includes a symmetric collision (full-wrap collision) in which the entire front surface of the vehicle collides, and an asymmetric collision (offset collision) in which one side of the front surface of the vehicle collides. In the present exemplary embodiment, among offset collisions, a micro-wrap collision, in which a portion of the front side member 12 at an outer side in the vehicle width direction at a front part of the vehicle collides with a collision body such as another vehicle, is envisioned in particular.

In the vehicle front part structure 10 according to the first exemplary embodiment, the crash box 14 is compressed in the front-rear direction during a micro-wrap collision, and then, the front side member 12 compresses in the axial direction (front-rear direction) and receives a collision load. At this time, since deformation of the front side member 12 is guided so as to move toward the vehicle inner side—that is, outward from the cross section of the front side member 12—along the outer surface of the convex part 30, fragments from fractures caused by a collision load applied to the front side member 12 can be inhibited from accumulating inside the front side member 12. Since this enables suppression of a situation in which the accumulation of debris inside the front side member 12 during a collision prevents the intended deformation of the front side member 12, the vehicle front part structure 10 can facilitate the realization of an intended amount of energy absorption.

Moreover, in the vehicle front part structure 10 according to the first exemplary embodiment, the vertex V of the convex part 30 is situated rearward of the center of the compartment 40 in the vehicle front-rear direction. Since this enables the range of the outer surface of the convex part 30 that projects outward on progression toward the rear of the vehicle to be wider than the range of an outer surface that projects outward on progression toward the front of the vehicle, it is possible to further facilitate inducement of deformation of the front side member 12 so as to move toward the vehicle inner side—namely, outward from the cross section of the front side member 12—during a collision.

Moreover, since, according to the vehicle front part structure 10 of the first exemplary embodiment, the start point S of the convex part 30 is disposed at a position corresponding to the front surface 42A of the compartment 40 in the vehicle front-rear direction, the convex part 30 can be positioned in a range including a location corresponding to the compartment 40 on the inner side surface 12A of the front side member 12. As a result, since the convex part 30 is formed in a range not including the vehicle front-rear direction partition wall 42 configuring the compartment 40—namely in a range including the easily deformable inner side surface 12A—deformation during a collision can be more easily induced.

Moreover, according to the vehicle front part structure 10 of the first exemplary embodiment, since the end point E of the convex part 30 is disposed at a position corresponding to the rear surface 42B of the compartment 40 in the vehicle front-rear direction, the convex part 30 can be positioned in a range including a location corresponding to the compartment 40 on the inner side surface 12A of the front side member 12. As a result, since the convex part 30 is formed in a range not including the vehicle front-rear direction partition wall 42 configuring the compartment 40—namely in a range including the easily deformable inner side surface 12A—deformation during a collision can be more easily induced.

Moreover, according to the vehicle front part structure 10 of the first exemplary embodiment, since the front side member 12 is provided with the convex parts 30 at each of the four compartments 40 situated at the front side of the vehicle, it is possible to further induce deformation of a location to which a collision load is applied a the time of a front collision.

Moreover, according to the vehicle front part structure 10 of the first exemplary embodiment, the pair of left and right front side members 12, the pair of left and right suspension towers 22, and peripheral components of the pair of left and right suspension towers 22—namely, the apron upper member 16, the fender apron 18, and the dash panel 20—are integrally molded by die casting. This enables the shape of the vehicle front part structure 10 to be designed with greater intricacy, enabling the degree of freedom of design to be improved. In the present exemplary embodiment, the convex part 30 of the front side member 12 can be more easily formed.

Modifications

Figure 5:
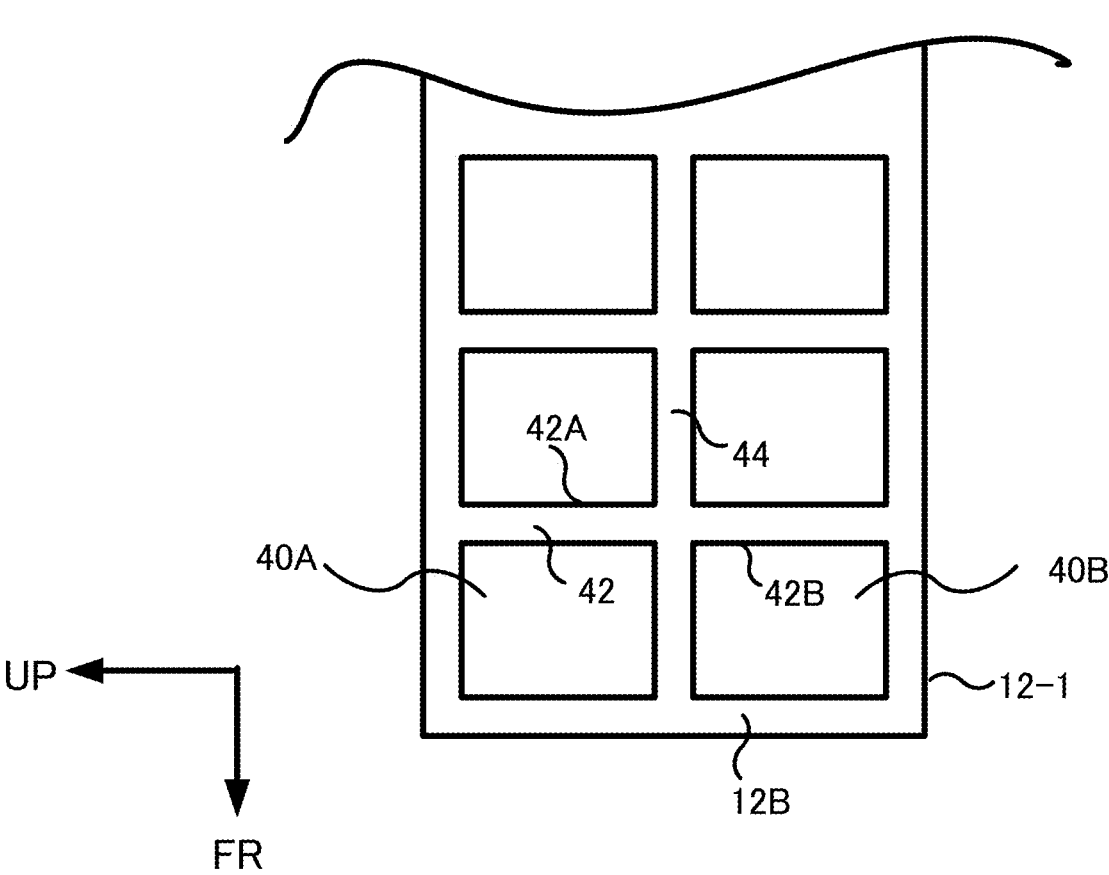
FIG. 5 is a side view of a front side member illustrating a modified example of a compartment.

In the first exemplary embodiment, the front side member 12 is provided with partition walls 42 extending in the vertical direction of the vehicle so as to form plural compartment chambers 40 arranged internally in the front-rear direction of the vehicle; however, the present disclosure is not limited thereto. FIG. 5 is a side view of the front side member 12 illustrating a modified example of the compartments 40.

As illustrated in FIG. 5, the front side member 12-1 of the modified example is the front side member 12 of the first exemplary embodiment illustrated in FIG. 3, which further includes a second partition wall 44 extending in the vehicle front-rear direction. By forming the second partition wall 44 in this manner, the front side member 12-1 can provide plural upper compartments 40A and lower compartments 40B aligned in the vehicle vertical direction, in the vehicle front-rear direction. Providing the second partition wall 44 as in the modified example enables the strength of the front side member 12-1 to be greater than the strength of the front side member 12 of the first exemplary embodiment.

Note that at least one of the partition wall 42 or the second partition wall 44 of the first exemplary embodiment or the modified example may be configured such that, for example, the outer side surface 12B is cut out inward in the vehicle width direction into an arc shape, a rectangular shape, or the like.

Second Exemplary Embodiment

Figure 6:
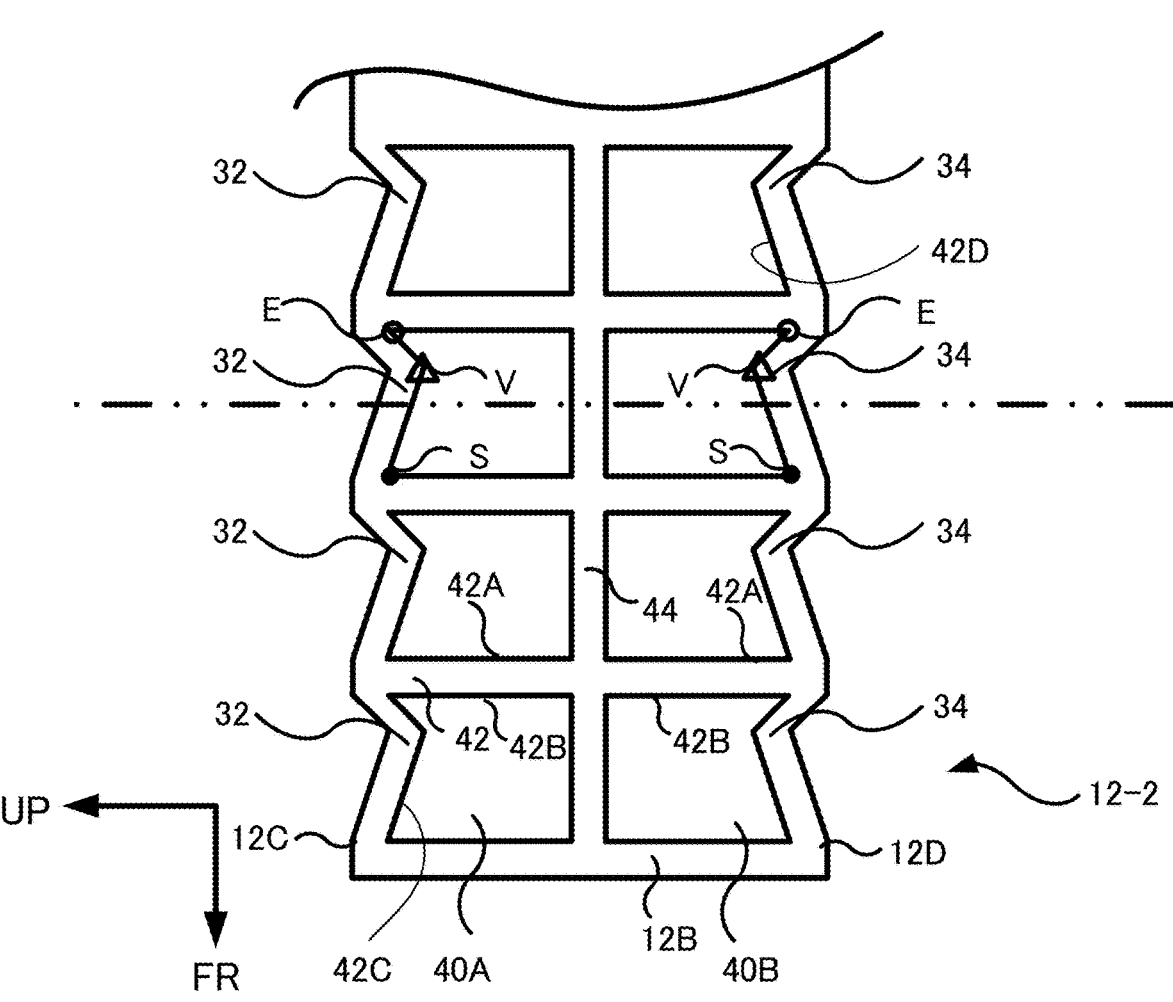
FIG. 6 is a side view illustrating a schematic configuration of a front end part of a front side member including a vehicle front part structure according to a second exemplary embodiment of the present disclosure.

Next, explanation follows regarding a vehicle front part structure according to a second exemplary embodiment of the present disclosure. Note that configurations similar to those of the first exemplary embodiment are denoted by the same reference numerals, explanation thereof is omitted, and only different configurations are described. FIG. 6 is a side view illustrating a schematic configuration of a front end part of a front side member 12-2 including a vehicle front part structure according to a second exemplary embodiment.

As illustrated in FIG. 6, in the front side member 12-2 of the second exemplary embodiment, rather than at the inner side surface 12A, convex parts are formed at an upper inside surface 42C and a lower inside surface 42D inside the front side member 12-2 that are respectively opposed to the upper surface 12C and the lower surface 12D of the front side member 12-2 in the vehicle vertical direction. In the present exemplary embodiment, a convex part formed at the upper inside surface 42C is an upper surface convex part 32, and a convex part formed at the lower inside surface 42D is a lower surface convex part 34.

The upper surface convex part 32 and the lower surface convex part 34 are formed continuously in the vehicle front-rear direction, and the upper surface convex part 32 and the lower surface convex part 34 are provided for each upper compartment 40A and each lower compartment 40B, respectively. The plural upper surface convex parts 32 and the plural lower surface convex parts 34 are configured so as to discharge fragments from fractures due to deformation during a vehicle collision outward from the cross section. More specifically, the upper surface convex part 32 is formed so as to project downward in the vehicle vertical direction on progression toward the rear of the vehicle, and the lower surface convex parts 34 are each formed so as to project upward in the vehicle vertical direction on progression toward the rear of the vehicle.

In the present exemplary embodiment, as illustrated in FIG. 5 as an example, the upper surface convex part 32 and the lower surface convex part 34 are respectively provided in the four upper compartments 40A and the four lower compartments 40B situated at the front side of the vehicle. The upper surface convex part 32 and the lower surface convex part 34 each have a start point S, a vertex V, and an end point E from the front of the vehicle toward the rear of the vehicle.

The vertices V of the upper surface convex part 32 and the lower surface convex part 34 are situated rearward of the center (illustrated by the two-dot chain line in FIG. 6) of the upper compartment 40A and the lower compartment 40B in the vehicle front-rear direction. In the present exemplary embodiment, as an example, the vertex V is positioned rearward of the center (illustrated by the two-dot chain line in FIG. 6) of the upper compartment 40A and the lower compartment 40B in the vehicle front-rear direction, and moreover, is positioned in a central vicinity, in the vehicle front-rear direction, of this rear side.

The start points S of the upper surface convex part 32 and the lower surface convex part 34 are disposed at positions corresponding to the front surfaces 42A of the upper compartment 40A and the lower compartment 40B. Note that the "position corresponding to the front surface 42A" is intended to be on the same plane as the front surface 42A or near the same plane as the front surface 42A.

The end points E of the upper surface convex part 32 and the lower surface convex part 34 are disposed at positions corresponding to the rear surfaces 42B of the upper compartment 40A and the lower compartment 40B. Note that the "position corresponding to the rear surface 42B" is intended to be on the same plane as the rear surface 42B or near the same plane as the rear surface 42B.

An end point E of the upper surface convex part 32 situated farthest toward the front of the vehicle is connected to the start point S of the next upper surface convex part 32 adjacent at the vehicle rearward side on the upper inside surface 42C. An end point E of the lower surface convex part 34 situated farthest toward the front of the vehicle is connected to the start point S of the next lower surface convex part 34 adjacent at the vehicle rearward side on the lower inside surface 42D. The upper surface convex part 32 and the lower surface convex part 34 of the present exemplary embodiment are formed as described above, and the other upper surface convex parts 32 and lower surface convex parts 34 are formed similarly to the upper surface convex part 32 and the lower surface convex part 34 situated farthest toward the front of the vehicle.

Note that the front side member 12-2 of the present exemplary embodiment may or may not include plural convex parts 30, similarly to the front side member 12 of the first exemplary embodiment described above.

Operation and Effect of the Second Exemplary Embodiment

Next, explanation follows regarding the operation and advantageous effects of the second exemplary embodiment.

A front side member 12-2 of the vehicle front part structure according to the second exemplary embodiment respectively includes plural upper surface convex parts 32 formed on the upper inside surface 42C and plural lower surface convex parts 34 formed on the lower inside surface 42D inside the front side member 12-2. Accordingly, since, during a collision, deformation of the front side member 12-2 is induced so as to move along the outer surfaces of the upper surface convex part 32 and the lower surface convex part 34, fragments from fractures caused by a collision load applied to the front side member 12-2 can be inhibited from accumulating inside the front side member 12-2. Since this enables suppression of a situation in which the accumulation of debris inside the front side member 12-2 during a collision prevents the intended deformation of the front side member 12-2, the vehicle front part structure 10 can facilitate the realization of an intended amount of energy absorption.

Moreover, since the front side member 12-2 of the vehicle front part structure according to the second exemplary embodiment includes the upper surface convex part 32 and the lower surface convex part 34, the same advantageous effects as those of the convex part 30 of the above-described exemplary embodiments can be obtained.

Similarly to the first exemplary embodiment, in the front side member 12-2 of the vehicle front part structure according to the second exemplary embodiment, a pair of left and right front side members 12-2, the pair of left and right suspension towers 22, and peripheral components of the pair of left and right suspension towers 22—namely, the apron upper member 16, the fender apron 18, and the dash panel 20—are integrally molded by die casting. This enables the shape of the vehicle front part structure to be designed with greater intricacy, enabling the degree of freedom of design to be improved. In the present exemplary embodiment, the upper surface convex part 32 and the lower surface convex part 34 of the front side member 12-2 can be more easily formed.

Third Exemplary Embodiment

Figure 7:
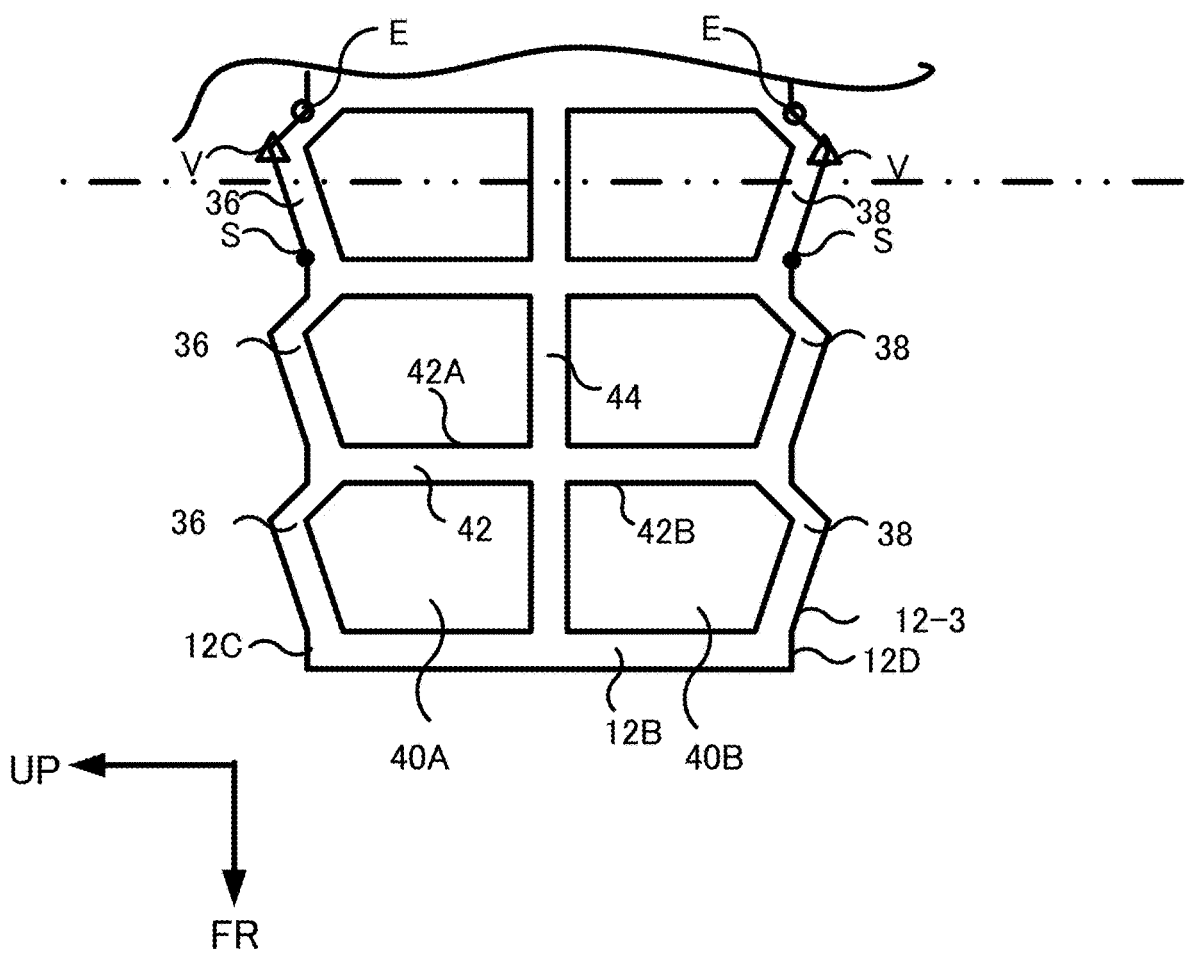
FIG. 7 is a side view illustrating a schematic configuration of a front end part of a front side member including a vehicle front part structure according to a third exemplary embodiment of the present disclosure.

Next, explanation follows regarding a vehicle front part structure according to a third exemplary embodiment of the present disclosure. Note that configurations similar to those of the first exemplary embodiment are denoted by the same reference numerals, explanation thereof is omitted, and only different configurations are described. FIG. 7 is a side view illustrating a schematic configuration of a front end part of a front side member 12-3 including the vehicle front part structure according to the third exemplary embodiment.

As illustrated in FIG. 7, in the front side member 12-3 of the third exemplary embodiment, rather than at the inner side surface 12A, convex parts are formed at the upper surface 12C and the lower surface 12D of the front side member 12-3 in the vehicle vertical direction. In the present exemplary embodiment, a convex part formed on the upper surface 12C is an upper surface convex part 36, and a convex part formed on the lower surface 12D is a lower surface convex part 38.

The upper surface convex part 36 and the lower surface convex part 38 are formed continuously in the front-rear direction of the vehicle. The upper surface convex part 36 is provided for each upper compartment 40A, and the lower surface convex part 38 is provided for each lower compartment 40B. The plural upper surface convex parts 36 and the plural lower surface convex parts 38 are configured so as to discharge fragments from fractures due to deformation during a vehicle collision outward from the cross section. More specifically, the upper surface convex part 36 is formed so as to project upward in the vehicle vertical direction on progression toward the rear of the vehicle, and the lower surface convex parts 38 are each formed so as to project downward in the vehicle vertical direction on progression toward the rear of the vehicle.

In the present exemplary embodiment, as illustrated in FIG. 7 as an example, the upper surface convex part 36 and the lower surface convex part 38 are respectively provided in the four upper compartments 40A and the four lower compartments 40B situated at the front side of the vehicle. The upper surface convex part 36 and the lower surface convex part 38 each have a start point S, a vertex V, and an end point E from the front of the vehicle toward the rear of the vehicle. Note that while in FIG. 7, for the sake of simplicity, the upper surface convex part 36 and the lower surface convex part 38 are provided at three upper compartments 40A and lower compartments 40B from the front side of the vehicle, in practice, similarly to the first exemplary embodiment, four upper surface convex parts 36 and four lower surface convex parts 38 are provided.

The vertices V of the upper surface convex part 36 and the lower surface convex part 38 are situated rearward of the center (indicated by the two-dot chain line in FIG. 7) of the upper compartment 40A and the lower compartment 40B in the vehicle front-rear direction. In the present exemplary embodiment, as an example, the vertex V is positioned rearward of the center (illustrated by the two-dot chain line in FIG. 7) of the upper compartment 40A and the lower compartment 40B in the vehicle front-rear direction, and is further located at a central vicinity, in the vehicle front-rear direction, of this rear side.

The start points S of the upper surface convex part 36 and the lower surface convex part 38 are disposed at positions corresponding to the front surfaces 42A of the upper compartment 40A and the lower compartment 40B. Note that the "position corresponding to the front surface 42A" is intended to be on the same plane as the front surface 42A or near the same plane as the front surface 42A.

The end points E of the upper surface convex part 36 and the lower surface convex part 38 are disposed at positions corresponding to the rear surfaces 42B of the upper compartment 40A and the lower compartment 40 B. Note that the "position corresponding to the rear surface 42B" is intended to be on the same plane as the rear surface 42B or near the same plane as the rear surface 42B.

An end point E of the upper surface convex part 36 situated farthest toward the front of the vehicle is connected to a start point S of the next upper surface convex part 36 adjacent on the vehicle rear side, on the upper surface 12C. The end point E of the lower surface convex part 38 situated farthest toward the front of the vehicle is connected to the start point S of the next lower surface convex part 38 adjacent on the vehicle rear side, on the bottom surface 12D. The upper surface convex part 36 and the lower surface convex part 38 of the present exemplary embodiment are formed as described above, and the other upper surface convex parts 36 and lower surface convex parts 38 are formed similarly to the upper surface convex part 36 and the lower surface convex part 38 situated farthest toward the front of the vehicle.

Note that the front side member 12-3 of the present exemplary embodiment may or may not include plural convex parts 30, similarly to the front side member 12 of the first exemplary embodiment described above.

Operation and Effect of the Third Exemplary Embodiment

Next, explanation follows regarding the operation and advantageous effects of the third exemplary embodiment.

The front side member 12-3 of the vehicle front part structure according to the third exemplary embodiment respectively includes plural upper surface convex parts 36 formed at an upper surface 12C, and plural lower surface convex parts 38 formed at a lower surface 12D, of the front side member 12-3. Accordingly, during a collision, since deformation of the front side member 12-3 is guided so as to move along the outer surfaces of the upper surface convex part 36 and the lower surface convex part 38, fragments from fractures caused by a collision load applied to the front side member 12-3 can be inhibited from accumulating inside the front side member 12-3. Since this enables suppression of a situation in which the accumulation of debris inside the front side member 12-3 during a collision prevents the intended deformation of the front side member 12-3, the vehicle front part structure can facilitate the realization of an intended amount of energy absorption.

Moreover, since the front side member 12-3 of the vehicle front part structure according to the third exemplary embodiment includes the upper surface convex part 36 and the lower surface convex part 38, the same advantageous effects as those of the convex part 30 of the above-described exemplary embodiments can be obtained.

Similarly to the first exemplary embodiment, in the front side member 12-3 of the vehicle front part structure according to the third exemplary embodiment, a pair of left and right front side members 12-3, the pair of left and right suspension towers 22, and peripheral components of the pair of left and right suspension towers 22—namely, the apron upper member 16, the fender apron 18, and the dash panel 20—are integrally molded by die casting. This enables the shape of the vehicle front part structure to be designed with greater intricacy, enabling the degree of freedom of design to be improved. In the present exemplary embodiment, the upper surface convex part 36 and the lower surface convex part 38 of the front side member 12-3 can be more easily formed.

SUPPLEMENTARY EXPLANATION

Figure 8:
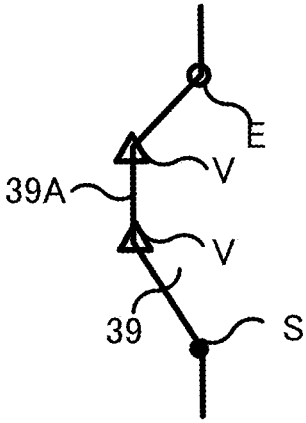
FIG. 8 is a schematic diagram illustrating a modified example of a convex part.

Note that although in the exemplary embodiments described above, the convex part has a shape including one vertex V, the present disclosure is not limited thereto. For example, as illustrated in FIG. 8, a convex part 39 may have two vertices V. In this case, the two vertices V are formed at the same height as each other, as an example, and may have a shape including a flat part 39A. Moreover, in this case, both of the two vertices V may be situated rearward of the center of the compartment 40 in the vehicle front-rear direction.

Although the front side members 12, 12-1, 12-2, and 12-3 are integrally formed by die casting in the exemplary embodiment described above, the present disclosure is not limited to this configuration, and the front side member may be formed separately or by a known technique other than die casting.

Although explanation has been given regarding exemplary embodiments of the present disclosure, the present disclosure is not limited to such exemplary embodiments, and various modified examples may be used in appropriate combinations, and obviously, various embodiments may be implemented within a range not departing from the spirit of the present disclosure.

What is claimed is:

1. A vehicle front part structure, comprising:

a left and right pair of suspension towers respectively disposed at left and right sides of a vehicle front part; and a left and right pair of front side members disposed at vehicle lower sides of the suspension towers, extending in a vehicle front-rear direction, having a plurality of compartments arranged internally in the vehicle front-rear direction, and having, at an inner side surface in a vehicle width direction, a plurality of convex parts that protrude outward on progression toward a vehicle rear, the plurality of convex parts being provided at the plurality of compartments and being formed continuously in the vehicle front-rear direction so as to discharge fragments from fractures caused by deformation at a time of a collision outward from a cross section, the vehicle front part structure being integrally molded by die casting, and a vertex of each of the convex parts being positioned further toward a rear side than a center of one of the compartments in the vehicle front-rear direction.

2. The vehicle front part structure of claim 1, wherein a start point of each of the convex parts is disposed at a position corresponding to a front face of one of the compartments in the vehicle front-rear direction.

3. The vehicle front part structure of claim 1, wherein an end point of each of the convex parts is disposed at a position corresponding to a rear face of one of the compartments in the vehicle front-rear direction.

4. The vehicle front part structure of claim 1, wherein, in the front side member, among the plurality of compartments, each of the convex parts is provided at each of a plurality of compartments positioned at a vehicle forward side.

5. A vehicle front part structure, comprising:

a left and right pair of suspension towers respectively disposed at left and right sides of a vehicle front part; and a left and right pair of front side members disposed at vehicle lower sides of the suspension towers, extending in a vehicle front-rear direction, having a plurality of compartments arranged internally in the vehicle front-rear direction, and having, at an inner side surface in a vehicle width direction, a plurality of convex parts that protrude outward on progression toward a vehicle rear, the plurality of convex parts being provided at the plurality of compartments and being formed continuously in the vehicle front-rear direction so as to discharge fragments from fractures caused by deformation at a time of a collision outward from a cross section, the vehicle front part structure being integrally molded by die casting, and a start point of each of the convex parts being disposed at a position corresponding to a front face of one of the compartments in the vehicle front-rear direction.

6. The vehicle front part structure of claim 5, wherein an end point of each of the convex parts is disposed at a position corresponding to a rear face of one of the compartments in the vehicle front-rear direction.

7. The vehicle front part structure of claim 5, wherein, in the front side member, among the plurality of compartments, each of the convex parts is provided at each of a plurality of compartments positioned at a vehicle forward side.

8. A vehicle front part structure, comprising:

a left and right pair of suspension towers respectively disposed at left and right sides of a vehicle front part; and a left and right pair of front side members disposed at vehicle lower sides of the suspension towers, extending in a vehicle front-rear direction, having a plurality of compartments arranged internally in the vehicle front-rear direction, and having, at an inner side surface in a vehicle width direction, a plurality of convex parts that protrude outward on progression toward a vehicle rear, the plurality of convex parts being provided at the plurality of compartments and being formed continuously in the vehicle front-rear direction so as to discharge fragments from fractures caused by deformation at a time of a collision outward from a cross section, the vehicle front part structure being integrally molded by die casting, and an end point of each of the convex parts being disposed at a position corresponding to a rear face of one of the compartments in the vehicle front-rear direction.

9. The vehicle front part structure of claim 8, wherein, in the front side member, among the plurality of compartments, each of the convex parts is provided at each of a plurality of compartments positioned at a vehicle forward side.

* * * * *